H. R. EVANS, DEC'D.
A. K. EVANS, EXECUTRIX.
MOTION PICTURE APPARATUS.
APPLICATION FILED APR. 17, 1915.

1,304,466.

Patented May 20, 1919.
3 SHEETS—SHEET 1.

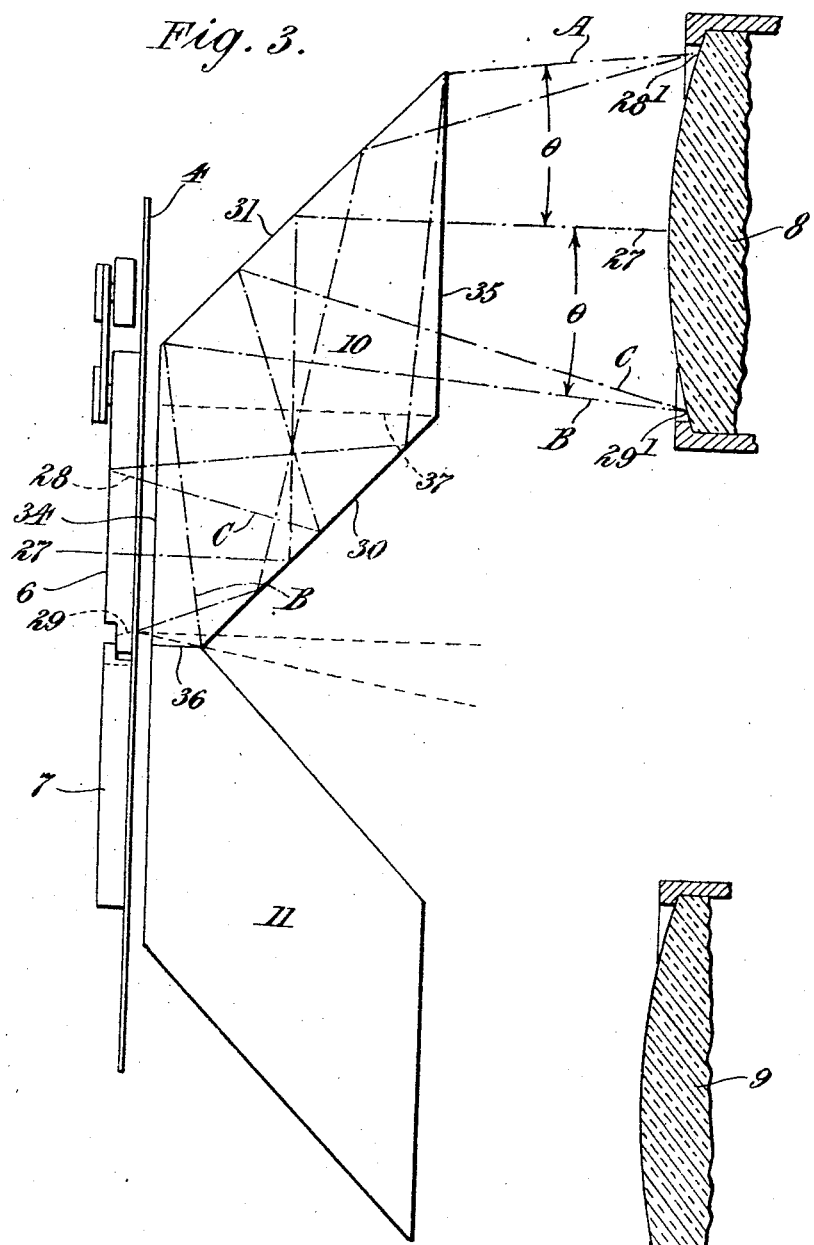

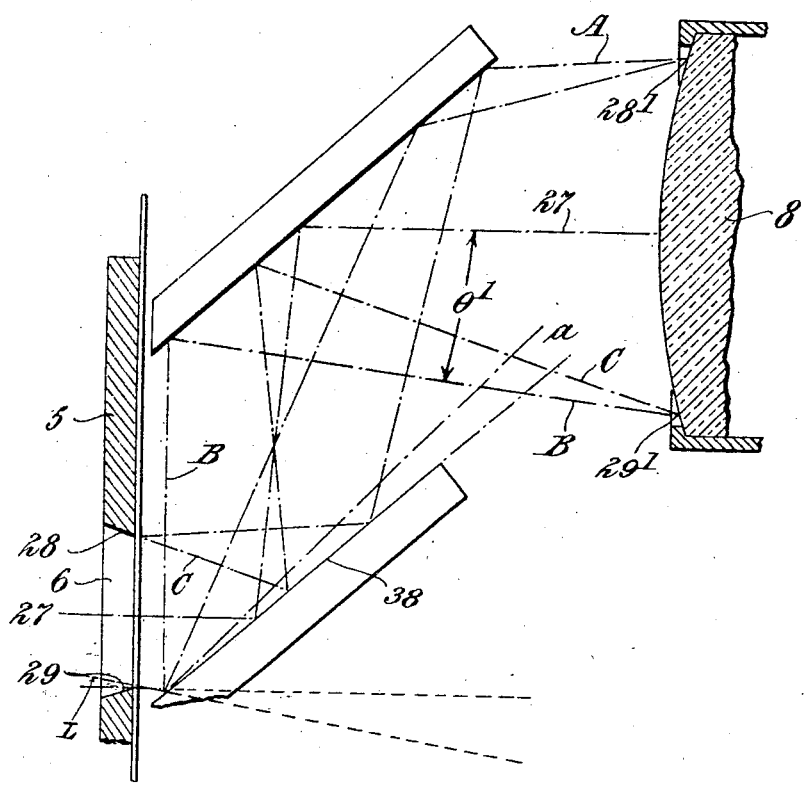

UNITED STATES PATENT OFFICE.

HENRY RIEGEL EVANS, OF LONDON, ENGLAND, ADELE KEAN EVANS EXECUTRIX OF SAID HENRY R. EVANS, DECEASED.

MOTION-PICTURE APPARATUS.

1,304,466.      Specification of Letters Patent.      Patented May 20, 1919.

Application filed April 17, 1915. Serial No. 22,028.

*To all whom it may concern:*

Be it known that I, HENRY RIEGEL EVANS, a citizen of the United States of America, residing at 60 Clarence Gate Gardens, Regent's Park, London, N. W., formerly of 88 Washington Place, New York city, New York, United States of America, have invented certain new and useful Improvements in Motion-Picture Apparatus, of which the following is a specification.

This application covers certain subject matter shown and described in my co-pending application filed March 28th 1914 on "Motion picture projecting apparatus," Serial No. 827889, and the invention relates to motion-picture apparatus of the kind provided with two apertures or windows through each of which an image may be projected or received; in some cases the apparatus is intended for the projection or reception of an image through both said apertures simultaneously.

According to the present invention there is provided for the pictures on the film a prism or other reflector having a "first" and a "second" reflecting surface each inclined to the film and so arranged that the termination of the "first" surface which is nearer to the film is farther from the film than the corresponding termination of the second reflecting surface. The reflector, when a prism, may conveniently have its reflecting surface "silvered" in order to utilize light which, being incident thereon at less than the critical angle, would otherwise not be reflected.

Where the "first" and "second" reflecting surfaces are parallel to one another, each may conveniently make such an angle with the picture that that ray which on its first reflection passes most closely to the picture either is substantially parallel thereto in that portion of its path or diverges outwardly therefrom; the object of this disposition of the surfaces is to utilize light which otherwise would be lost.

If a prism is employed it may, according to one feature of this invention, be pivoted about a horizontal axis parallel to the film, or the equivalent arrangement may be employed of two pivoted mirrors linked together; the object of either of these said arrangements is to provide for adjustment of the position of the reflected image with a minimum of distortion.

In the accompanying drawings:—

Fig. 3 is a view of the reflectors and some of the parts adjacent thereto, seen in Fig. 1, but to a larger scale than that of Fig. 1, and showing diagrammatically the paths of the light rays; and Fig. 4 is a view similar to Fig. 3 of portion of an alternative construction of reflector.

Figure 1:
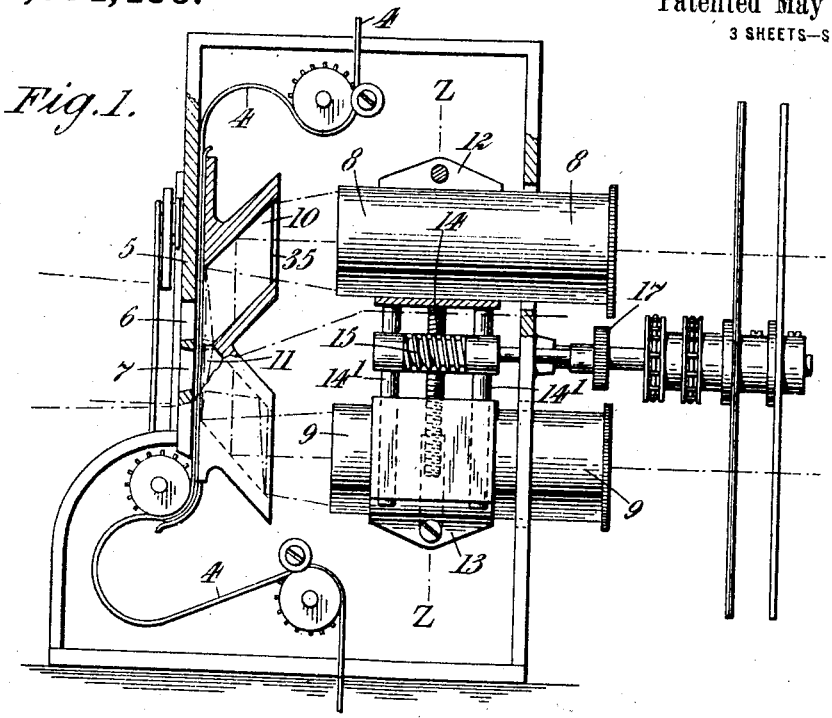
Figure 1 is a side elevation of a motion-head of a projector according to this invention in part vertical section.
Figure 2:
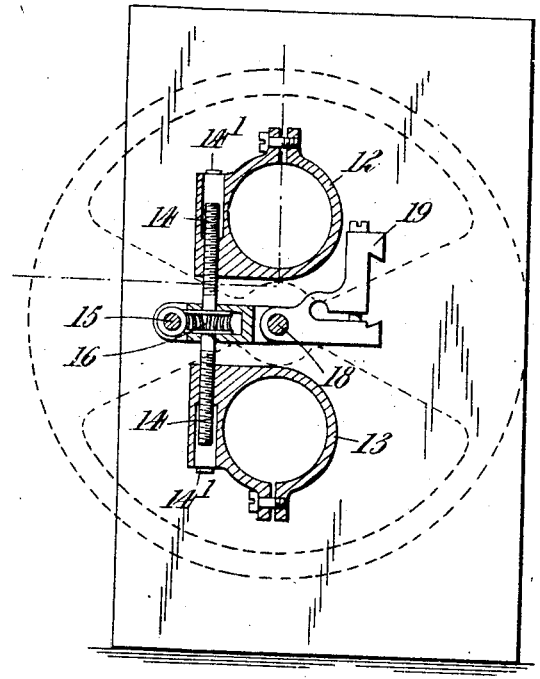
Fig. 2 is a diagrammatic front view of the same taken in section on line Z—Z of Fig. 1.

The film 4 seen in Fig. 1 is fed past the double aperture plate 5, seen in Fig. 1, so that each picture on the film passes successively the window 6 and the window 7. The pictures are reflected into optical alinement with their respective upper and lower objective lenses 8 and 9 by the corresponding reflecting prisms 10 and 11. Either the prisms 10 and 11 or the objective lenses 8 and 9 should be vertically and laterally adjustable by means which while causing the pictures to shift upon the screen will preserve the parallelism of the reflecting devices and of the arcs of the objectives, for the purpose of superposing properly and with precision the two images upon the screen. I prefer to have the prisms stationarily mounted so as to be more free from vibration and to have the adjustment applied to the objective lenses. As shown in Figs. 1 and 2 the upper and lower lenses are securely held by their respective carriages 12 and 13 slidably mounted upon the guide-rods 14¹, and vertically adjustable relatively but remaining always parallel to each other by the right and left hand screw 14 operated through the worm and gear 15 and 16 by the thumb nut 17. They are also made laterally adjustable by rotation upon the pivot pin 18 mounted in the focusing slide 19 carrying the said lens-carriages and vertical adjusting mechanism. The whole may be made to oscillate about the pivot as an axis within the slight limits of lateral adjustment required.

It is very important that the shape, size and position of the reflectors or reflecting prisms used bear a certain relation to the location and size of the pictures upon the film and to that area of the objective lens capable of transmitting light from the film to the screen which area is indicated in Figs.

3 and 4 as lying between the two extreme light beams A and B. In practice this area should be always greater than the area of the picture on the film in order to collect a maximum illumination for the image upon the screen. From this fact it will readily be seen (Fig. 3) that if the center of the picture on the film is in optical alinement through reflection with the optical axis 27 of the objective lens, and the picture is normal thereto, a ray of light A traced from the top 28 of the upper window 6 to the top of the effective lens area 28'—and a ray B traced from the bottom 29 of the same window to the bottom of the effective lens area at 29' will both diverge equally from the principal optical axis. Now, if the first reflecting surface 30 makes an angle of 45° or less with the film, the ray B is the extreme useful ray coming from that surface in the neighborhood of the film. The rest of the surface 30 if it were continued to a point as near the film as is the corresponding termination of the surface 31 would not only be useless therefore but to some degree harmful. It will be useless because rays reflected from it would not impinge upon the surface 31, and would be harmful in so far as such rays might be internally reflected and tend to introduce blur. At the same time such continuation downwardly of the surface 30 would interfere with such a close approach to this prism of the corresponding prism 11 for the picture below as is to be desired.

I therefore cut the prism to form a fifth surface 36 which should be roughened and blackened or otherwise made an absorbing surface. This cutting off the angle to form a fifth surface 36 permits a corresponding and symmetrical prism for the picture in the window below to be similarly treated and to be brought as close as desired to the upper prism. I am thus able to render the prisms serviceable for use with a film on which the pictures are as close together as is customary; undue length of the film is thus obviated. The first transparent surface 34 and the second 35 should be parallel to the film and the vertical and horizontal dimensions of the surface 35 should be greater than those of the diverged beam of light it has to transmit, with a liberal allowance for adjustment of the objectives laterally and vertically. The reflecting surfaces should be "silvered" that is to say silvered or correspondingly treated in order that rays having less than the critical angle of incidence such as the ray C shall be reflected and not absorbed. Each prism may be made up as a main prism constituted by two subordinate prisms in contact in the neighborhood of the dotted line 37 of Fig. 3.

As an alternative for vertical adjustment a prism may with advantage be pivotally mounted about a horizontal axis parallel to the film to get the necessary vertical adjustment of the image on the screen for superposition. This method has the advantage of tilting both the reflecting surfaces simultaneously through the same angle but the method is not so desirable as the adjustment of the objectives hereinbefore described. Where separate pivoted mirrors are used they should be linked together so as to move simultaneously through the same angle, which arrangement I regard as equivalent to the horizontal pivoting of the prism.

It may sometimes be desired to employ a pair of parallel reflectors so placed that the first reflecting surface terminates closer to the plane of the film than does the surface 30 in Fig. 3. In such a case the ray B, seen in Fig. 3, is no longer the extreme ray caught by the said surface but the latter will catch other rays which, if the angle between the surface and the film be 45°, will be reflected back toward the film so as to miss the second reflecting surface and so not only to be lost for useful work but behave as scattered light with an objectionable result. When, therefore, the first reflecting surface is brought nearer to the film, as is seen in Fig. 4, at surface 38, then this surface should be tilted to make an angle greater than 45° with the film. When this is the case the angle is so chosen that the inner extreme ray is not thrown back on to the film but is reflected parallel to the film, or forwardly of that path, so as to be caught on the second reflecting surface. This is exemplified in Fig. 4. The inner extreme ray, B, in the arrangement of Fig. 4, is deflected by its first reflection into a path parallel to the film and after its second reflection impinges upon the objective lens at its outer margin. This ray makes the angle $\theta'$ with the principal optical axis 27, and in order that the path of B should be as shown the first reflecting surface 38 must make an angle with the film which is greater than 45° by what I term an excess angle, indicated at $a$ in Fig. 4; this excess angle $a$ must be equal to substantially one-half of $\theta'$ or be greater than one-half of said angle if B on its first reflection is to be parallel to the film.

If a greater excess angle than one-half of $\theta'$ be employed, B on its first reflection will diverge forwardly of a path parallel to the film and will still be utilized so that an excess angle greater than half $\theta'$ may be employed without serious detriment to the illumination of the screen.

What I claim as my invention and desire to secure by Letters Patent is:

1. In a motion-picture apparatus the combination of a window for the film, an objective lens, and reflecting means between the window and the lens adapted to reflect the picture twice and having first and second reflecting surfaces parallel to one another, the first said surface being so dimensioned and positioned that divergent light rays falling on its margin nearest to the window from that margin of the window which is nearest to it, is reflected on to the said second surface and thence to that extreme useful margin of the lens which is toward the said first surface.

2. In a motion-picture apparatus the combination of a window for the film, an objective lens, and reflecting means between the window and the lens adapted to reflect the picture twice and having first and second reflecting surfaces parallel to one another and inclined to the plane of the said window, the said first surface not extending nearer to the plane of the window than is just sufficient to reflect divergent light rays falling on its margin nearest the window from that margin of the window which is nearest to it on to the said second surface and thence to that extreme useful margin of the lens which is toward the said first surface.

3. In motion picture apparatus for the superposition of images of successive pictures, the combination of two windows through which the picture images are projected, two objective lenses and two prisms one between each objective lens and window and adapted to reflect the pictures twice and each having first and second reflecting surfaces parallel to one another and including an angle with the plane of the said windows of not more than 45°, each prism being cut away at that extremity of its first reflecting surface nearest the plane of the window so that said first surface will not project nearer than is just sufficient to reflect light falling on its margin nearest the adjacent window from that margin of the window which is nearest to it, onto the said second surface and thence to that extreme useful margin of the lens which is toward the said first surface.

4. In motion picture apparatus for the superposition of images of successive pictures, the combination of two windows through which the picture images are projected, two objective lenses and two prisms one between each objective lens and window and adapted to reflect the pictures twice and each having first and second reflecting surfaces parallel to one another and including an angle with the plane of the said windows of not more than 45°, each prism being cut away at that extremity of its first reflecting surface nearest the plane of the window so that said first surface will not project nearer than is just sufficient to reflect divergent light rays falling on its margin nearest the adjacent window from that margin of the window which is nearest to it, onto the said second surface and thence to that extreme useful margin of the lens which is toward the said first surface, the surfaces produced by the said cutting away of the prisms being treated to prevent reflection of the light rays from the same.

5. In motion picture apparatus for the superposition of images of successive pictures, the combination of two windows through which the picture images are projected, two objective lenses and two pairs of reflecting surfaces, one pair between each objective lens and window, each pair adapted to reflect a picture twice and having first and second reflecting surfaces parallel to one another and including an angle with the plane of the said windows of not more than 45°, the first reflecting surface of each pair not extending nearer to the plane of the corresponding window than is just sufficient to reflect divergent light rays falling on its margin nearest the said window from that margin of said window which is nearest to said first surface onto the second surface of said pair and thence to that extreme useful margin of the corresponding objective lens which is toward said first surface.

6. In a motion-picture apparatus the combination of a window for the film, an objective lens, and reflecting means between the window and the lens adapted to reflect the picture twice and having first and second reflecting surfaces parallel to one another, the said means being pivotally supported to permit adjustment of the angle included by the said surfaces with the plane of the window while maintaining parallelism of the said surfaces, the first said surface being so dimensioned and positioned that divergent light rays falling on its margin nearest to the window from that margin of the window which is nearest to it, is reflected on to the said second surface and thence to that extreme useful margin of the lens which is toward the said first surface.

In testimony whereof I have signed my name to this specification in the presence of two subscribing witnesses.

HENRY RIEGEL EVANS.

Witnesses:
WM. JNO. TENNANT,
HARRY S. MIDGE.